Figure 1:
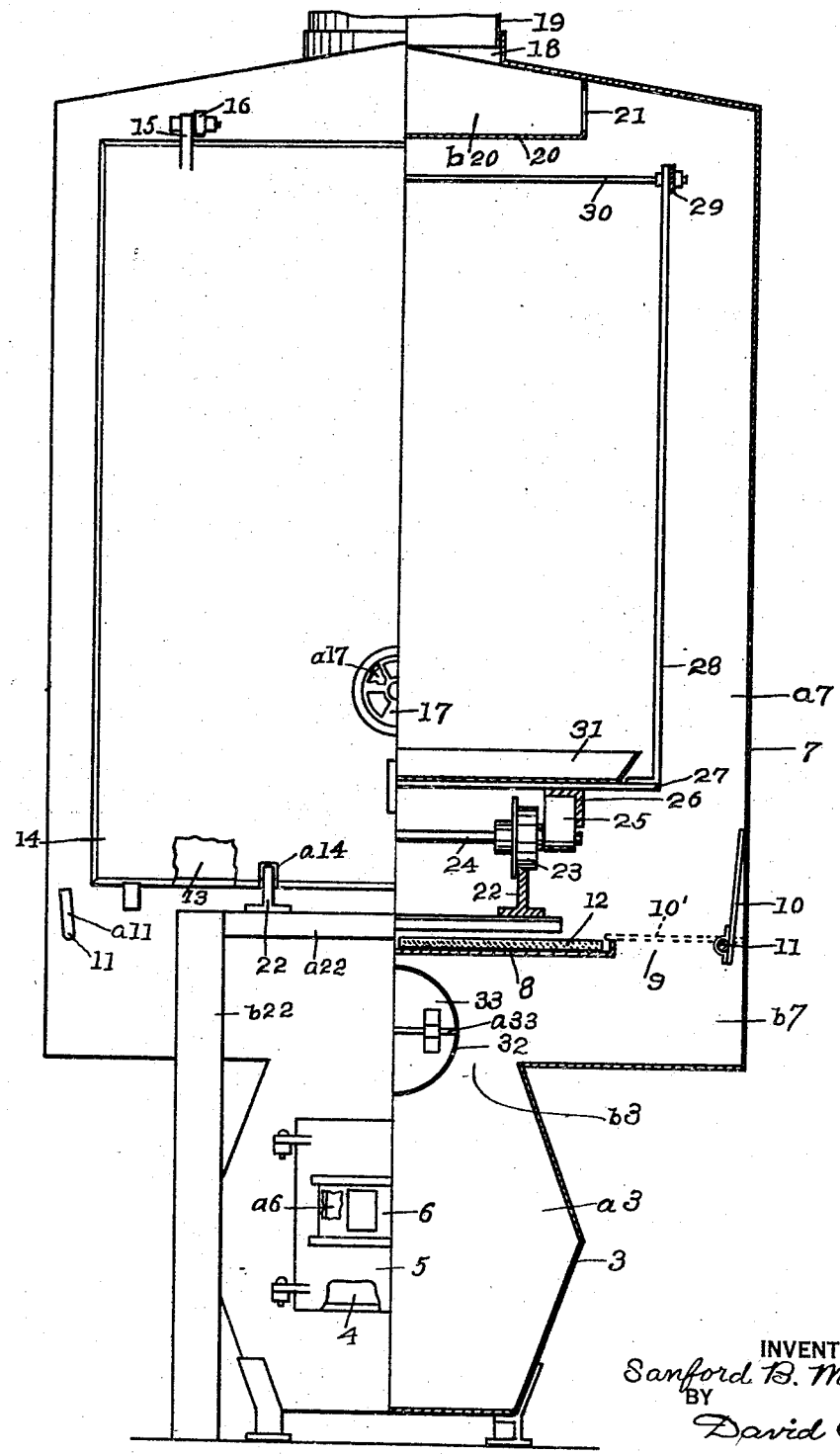

Sept. 8, 1931.  S. B. MAYHEW  1,822,355
BARBECUE STOVE
Filed Aug. 6, 1929  2 Sheets-Sheet 1

INVENTOR,
Sanford B. Mayhew.
BY
David E. Lains,
ATTORNEY.

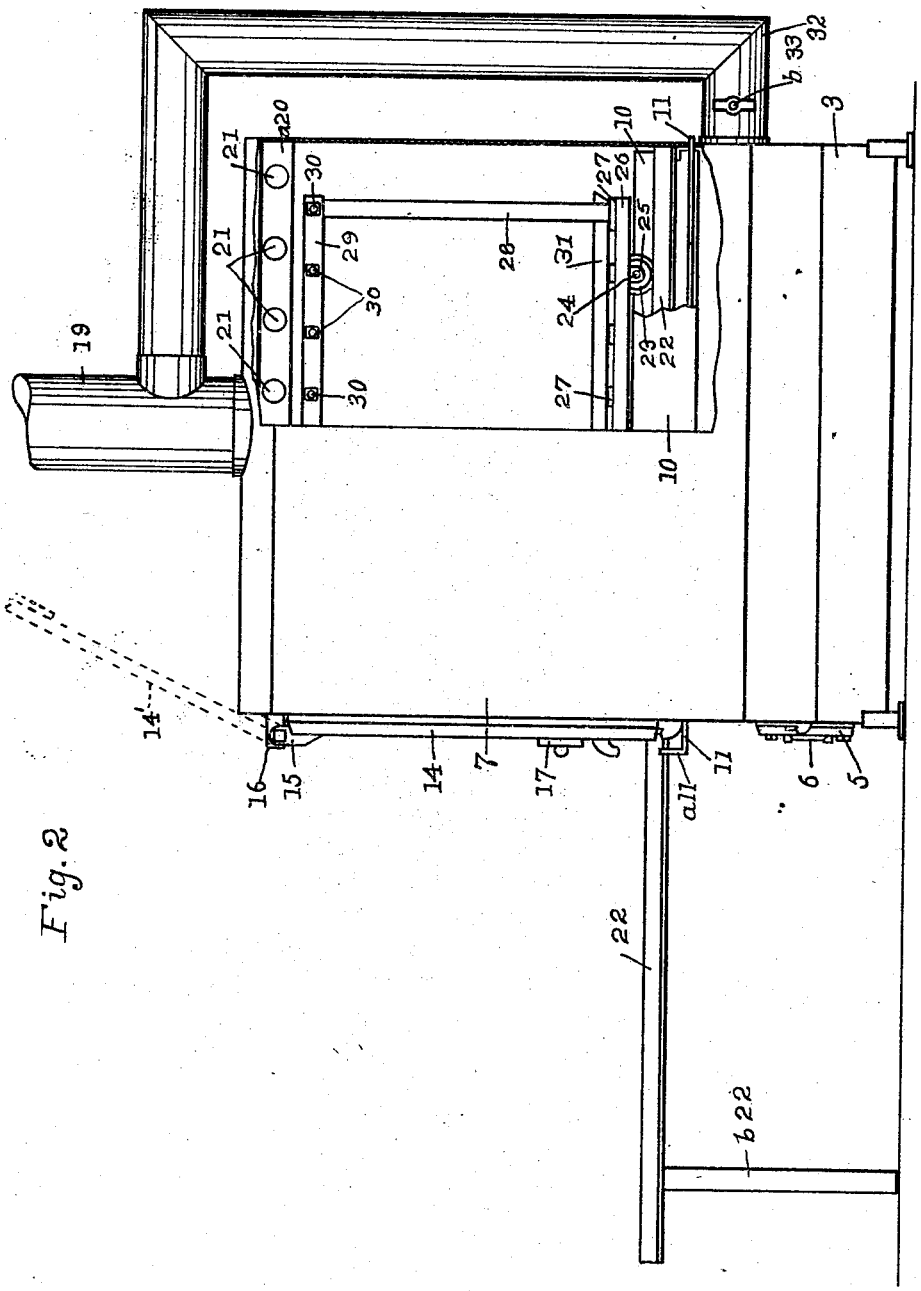

Patented Sept. 8, 1931

1,822,355

UNITED STATES PATENT OFFICE

SANFORD B. MAYHEW, OF MARIETTA TOWNSHIP, WHATCOM COUNTY, WASHINGTON

BARBECUE STOVE

Application filed August 6, 1929. Serial No. 383,920.

My invention relates to improvements in barbecue stoves and has for an object to provide a stove in which the process of barbecuing fish, shell fish, meats, and the like edibles may be conducted as successfully and more conveniently than when using open air or trench methods.

Another object of my improvement is to provide a barbecue stove made suitable for baking or broiling said edibles therein by simple adjustments thereof.

Another object of my improvement is to provide a barbecue stove adapted for the employment of a wheeled truck on which said edibles may be stored and moved into the barbecuing chamber to remain during the period of treatment and then be removed from said chamber for subsequent disposal.

Other objects of my improvement will appear as the description proceeds.

I attain these and other objects of my improvement with the device illustrated in the two sheets of accompanying drawings, which form a part of this specification, in which Figure 1 is a front end elevation of my stove and appurtenances and Fig. 2 is a side elevation of the same drawn on a smaller scale.

Similar characters refer to similar parts throughout. Certain parts are broken away to show other parts hidden thereby.

With more particular reference to the designated parts: A fire box 3 encloses combustion chamber $a3$ and has a stoke hole 4 in its front end which is closable by hinged door 5 having draught slide 6 mounted thereon to control draught openings $a6$ therethrough.

The walls of firebox 3 connect above with the walls of oven 7 and provide no cover for combustion chamber $a3$ which communicates with the chambers of said oven through longitudinal opening $b3$. Above opening $b3$ within the oven is longitudinal baffle plate 8 which is fastened to the end walls of the oven but does not extend laterally to the side walls providing openings 9, one of which is shown in Fig. 1, therebetween. Dampers 10, 10 are fastened to damper rods 11, 11 for oscillation therewith. Said rods are mounted for oscillation in openings through the end walls of the oven and have external handles $a11$, $a11$ for convenient operation. Dampers 10 are shown in their open position but when turned to their closed position, indicated in dotted lines at 10' in Fig. 1, passages 9, 9 are closed and the oven is divided in two parts, chamber $a7$ above baffle 8 and chamber $b7$ below the same.

On top of baffle 8 are placed removable heat-insulating pads 12 to cover the same.

In the front oven wall is door opening 13 closable by door 14. This door is preferably hinged along its upper edge and has lugs 15 fastened to the door and lugs 16 fastened to the oven wall connected by hinge bolts through registering holes in said lugs. Perforated draught wheel 17 is pivoted to door 14 over cold-air inlets $a17$ to control the quantity of air admitted therethrough.

Centrally in the top of oven 7 is smoke outlet opening 18 connected with smoke pipe 19. Beneath opening 18 is a baffle consisting of bottom 20 and side walls $a20$ joined to the oven walls providing chamber $b20$ communicating with opening 18, and distributed over said baffle side walls $a20$ are openings 21 providing communication between chambers $a7$ and $b20$. The added areas of holes 21 preferably equals the area of hole 18.

Parallel, horizontal T rail tracks 22, 22 are fastened in the lower part of chamber $a7$ above and near baffle plate 8 and extend from the rear end of said chamber through the front wall of the oven and terminate at a distance in front of the stove where they are supported by beam $a22$ fastened to legs $b22$, $b22$. Where they are extended through said front wall the web of said rails projects above the bottom of door opening 13 and notches, one of which is shown at $a14$, are provided in the lower edge of door 14 to avoid contact of said door with the tracks.

On tracks 22, 22 is mounted a truck rolling gear consisting of two axles 24 with flanged wheels 23 fastened thereon. Said axles are mounted for revolution in truck bearings 25 which are fastened together by body rails 26 beneath floor slats 27 to which they are fastened. Uprights 28 are fastened to the truck floor and to their upper ends are fastened two bars 29 through which are aligned holes. A plurality of rods 30 are fastened in said holes in bars 29 to provide supports on which fish, meats and the like may be hung. On the floor of the truck is placed dripping pan 31 which may be removed when so desired.

Said truck is of dimensions to occupy chamber a7 with free space on all sides thereof. When door 14 is opened to occupy its dotted-line position in Fig. 2 at 14' the truck may be rolled back and forth through doorway 13 to remain either within the oven or on the exterior thereof on the outside ends of tracks 22, 22 as preferred.

By-pass smoke pipe 32 is connected through the rear wall of the oven to chamber b7 beneath baffle plate 8, and is extended upward to connect with main smoke pipe 19. A tight damper 33 is mounted within pipe 32 for oscillation by damper rod a33 which is provided with external handle b33 for conveniently turning said damper.

In operation: For barbecuing fish, the truck is placed outside of the oven and the properly dressed and spitted fish are hung on rods 30. Dripping pan 31 is removed from the truck floor. All or only a portion of pads 12 are left on baffle 8. The truck is run into the oven and door 14 is closed. Perforated cover 17 is set to close the cold air openings underneath. Dampers 10, 10 remain open. Damper 33 remains closed.

A low smoking wood fire is maintained in fire box 3 under control of draught slide 6. Smoke from said fire rises through opening b3 into chamber b7 from which it passes through long narrow side openings 9 into chamber a7, on its way to smoke pipe 19. The quantity of draught air allowed to enter the combustion chamber is small and the smoke moves slowly through chamber a7. In order to enter the smoke pipe it is divided among the widely scattered smoke holes 21 and thus is quite evenly distributed over the entire oven and among the fish hanging from rods 30. Heat from the fire in the combustion chamber accompanies the smoke and also passes through baffle 8 and maintains a temperature in the oven best suited for slowly cooking the fish while the smoking thereof proceeds. The amount of this temperature is controlled by the size of the fire and the amount of air admitted through slide 6. When desired the condition of the fish in the oven may be determined by an examination through partly opened door 14. After the cooking and smoking is completed door 14 is fully opened and the truck removed to an outside location on rails 22 when the fish may be removed as desired.

If it is preferred to allow the fish to remain in the oven for a time following the completion of the barbecuing process, door 14 remains closed, cold-air wheel 17 is turned to uncover the openings through door 14, damper 33 is opened and dampers 10, 10 are closed. Now no additional smoke will pass into the oven, air admitted through wheel 17 will clear the oven of the smoke therein which will gradually pass out through pipe 19, and the desired quantity of heat to maintain the temperature of the fish in the oven will pass thereinto through baffle 8 and closed dampers 10, 10. The quantity of the heat thus transmitted may be controlled by the size of the fire maintained in chamber a3.

To barbecue meats and the like the same arrangements of the several controls are used as for fish above described, except that all of pads 12 are removed and dripping pan 31 is placed on the truck floor beneath the meat. More heat, and sometimes less smoke will be required in processing meat than are needed for fish. The hotter the fire the less the smoke output therefrom so these changes are easily arranged.

To broil or bake fish or meats without smoking the same pan 31 remains on the truck beneath the material, wheel 17 is set to admit but little air, all of pads 12 are removed, dampers 10, 10 are closed and damper 33 is opened. A fire is maintained providing a degree of temperature in the oven to suit the results desired and for a time to attain the desired completeness of cooking, and, as before, access to the materials in the oven for examination as to condition is afforded through partly open door 14.

It is thus apparent that my stove provides new and useful means for attaining the objects stated.

Having thus disclosed my invention, what I claim as new therein and desire to secure by Letters Patent is,—

A barbecue stove consisting of a firebox having an opening in its top, an oven on top of said firebox communicating therewith through said top opening therein, said oven having a lower outlet opening and an upper outlet opening, a baffle in said oven above said firebox opening and above said lower oven outlet opening having its edges disposed adjacent the walls of said oven providing spaces therebetween, a plurality of removable heat-resisting pads disposed on top of said baffle, dampers mounted in said oven to close said baffle spaces to divide said oven into lower and upper chambers, a smoke pipe connected with said upper oven outlet, a by-pass smoke pipe connected with said lower oven outlet opening and with said smoke pipe, and a tight damper mounted in said by-pass smoke pipe.

SANFORD B. MAYHEW.